United States Patent [19]
Blandford

[11] Patent Number: 5,189,700
[45] Date of Patent: Feb. 23, 1993

[54] DEVICES TO (1) SUPPLY AUTHENTICATED TIME AND (2) TIME STAMP AND AUTHENTICATE DIGITAL DOCUMENTS

[76] Inventor: Robert R. Blandford, 1809 Paul Spring Rd., Alexandria, Va. 22307

[21] Appl. No.: 637,675

[22] Filed: Jan. 7, 1991

Related U.S. Application Data

[63] Continuation-in-part of Ser. No. 375,502, Jul. 5, 1989.

[51] Int. Cl.$^5$ .......................... H04K 1/00; H04K 9/00; G07D 7/00
[52] U.S. Cl. ................................. 380/23; 340/825.34; 380/51
[58] Field of Search ................. 380/23, 51; 340/825.34

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/30 |
| 4,424,414 | 1/1984 | Hellman et al. | 380/30 |
| 4,465,901 | 8/1984 | Best | 380/4 |
| 4,685,056 | 8/1987 | Barnsdale | 380/4 |
| 4,904,851 | 2/1990 | Yukino | 380/24 |
| 4,908,861 | 3/1990 | Brachtl et al. | 380/25 |
| 4,934,846 | 6/1990 | Gilham | 380/23 |
| 4,944,008 | 7/1990 | Piosenka et al. | 380/25 |
| 5,001,752 | 3/1991 | Fisher | 380/23 |
| 5,022,080 | 6/1991 | Durst et al. | 380/23 |

FOREIGN PATENT DOCUMENTS 0422757 4/1991 European Pat. Off. .

OTHER PUBLICATIONS

Haber et al., "How to Time-Stamp a Digital Document", *Advances in Cryptology—CRYPTO '90 Proceedings*, Jul. 1992.

Haber, Stuart and Stornetta, W. Scott, "How to Time-Stamp a Digital Document", *Advances in Cryptology—Crypto '90*, Jul. 1990.

Carlson, Bob, "Time Stamp for Electronic Documents Defies Tampering", Update, 1990.

*Primary Examiner*—Stephen C. Buczinski
*Attorney, Agent, or Firm*—Donald W. Marks

[57] ABSTRACT

A device to provide authenticated time includes a clock and an encryption circuit enclosed by a seal with a controller for producing an encrypted authentication code of the time read for the clock upon request. An authentication device number can be combined with the time data before encryption. Additionally, the device can receive text or other data (either complete text or a hash of a text document) and combine the text data with the time data before encryption so that the encrypted authentication code is formed from the combined data. Optionally the device can produce, time stamp and authenticate the hash of data. Other material such as user and/or device sequence number and/or a random number can be included in the data used in forming the encrypted authentication code.

20 Claims, 1 Drawing Sheet

DEVICES TO (1) SUPPLY AUTHENTICATED TIME AND (2) TIME STAMP AND AUTHENTICATE DIGITAL DOCUMENTS

CROSS-REFERENCE TO RELATED APPLICATION(S)

This application is a continuation-in-part of my copending U.S. patent application Ser. No. 07/375,502 filed Jul. 5, 1989, for AN ARCHIVAL, SECURE DIGITAL MEMORY SYSTEM.

BACKGROUND OF THE INVENTION

This invention relates to devices (1) to authenticated time to a computer or other user; and (2) to assure that a specified digital document did in fact originate with a particular person and was stamped at a particular time and in a particular order by a particular authentication device.

In recent years there have been many articles in the trade and popular press describing incidents in which computer records have been erased or altered illegally.

Computer records are particularly liable to such alteration; they can be less secure in this respect than are paper records because an altered paper record may reveal erasures. Even if a paper record is created from scratch, the age of the paper or ink on a single sheet of paper, or progression in a bound notebook, may reveal the forgery. Such aging does not occur for computer records. And, of course, handwriting or other forensic analysis may reveal that a paper document was signed by other than the nominal author.

Even permanent records on such WORM devices as optical disks may be read and re-written, possibly with falsified dates, on a fresh disk after making desired alterations.

This, and many other falsification techniques available, for example, to a superuser or other "owner" of a computer system would be made more difficult if all computers were required by hardware to access an authenticated source of time in order to set the system clock.

From a positive point of view, it would be desirable if computer records could take the place of paper records for legal purposes, thus minimizing the large volume of stored paper.

As another use, a person keeping a diary would like to be sure that the record, once committed to the permanent computer recording device, cannot be undetectably altered even by himself.

In these cases it may be important that archived records be traceable to the person who actually created them, that the records be unaltered, unalterably time-stamped and sequenced, that it be clear which physical device actually performed the time stamping and authentication, and that access to the records be controlled by passwords and other means.

It would also be desirable if paper copies of the original digital records could be certified as authentic; i.e. that it could be verified that each copy was archived by a particular person on a particular machine at the indicated time. It would also be desirable that it could be shown that no documents are missing from a nominally complete file of the paper records.

A publication presented at a conference, "Advances in Cryptology--Crypto '90," Springer-Verlag, LNCS by Stuart Haber and W. Scott Stornetta entitled "How to Time-Stamp a Digital Document" discloses two techniques for time-stamping documents.

In their first technique, Haber and Stornetta employ a central Time Stamping Service (TSS) to achieve the time stamping by computing a digital encrypted authentication code from a fixed length encrypted code derived from the document and commonly called a "hash", plus the users ID, plus the time, plus a sequence number assigned by the TSS, plus information linking this request to the previous user (the time, ID, and hash of the previous user). Haber and Stornetta discuss cryptographically secure one-way hash functions and provide a reference to a practical source of such functions. The TSS also eventually provides the user with the IDs of one or more subsequent users. The time information is thus constrained to be approximately authenticated by the fact that the user, or some other verifier, could later consult the previous and subsequent users of TSS to verify that the document in question was authenticated between the times recorded by the previous and subsequent users.

The second technique of Haber and Stornetta does not employ any TSS; the user simply sends the hash out to a carefully randomly selected set of authenticators; they append the time from their own clocks and return a set of encrypted authentication codes.

Both of Haber and Stornetta's approaches are vulnerable to collusion on the part of a set of users; especially, for example, in the case where the network of users is all in a single institution under a single system manager, e.g. a single large manufacturer, or government agency, or insurance firm.

Also, since they require timely access to a communication system and to one or more cooperating and reliable computer systems, the approaches of Haber and Stornetta are unsuitable for an isolated system such as the typical personal computer or portable "diary" or to "secure" users which would prefer to have no contact with outside users.

SUMMARY OF THE INVENTION

It is one object of the present invention to provide a device which can provide authenticated time to any client; and it is a second object to provide means to ensure that a computer making use of this device cannot be booted with an incorrect time.

The first object may be achieved by sealing together in a single package a digital real-time clock and an encryption circuit with a secret key which is inaccessible from outside the system. The seal should be tamper-proof so that a breach of it is apparent upon inspection and so that a breach of the seal will cause the system to permanently cease operation.

In the present invention, the real-time clock either can not be reset, or can be reset only under strict procedures, and the encryption circuit can compute a digital encrypted authentication code using the secret key.

For the purpose of (1) providing encrypted authentication code of time, the authentication device upon request computes the encrypted authentication code from a combination of time from the sealed clock and an identification number (ID) of the device, and returns the time and the encrypted authentication code to the user. If the encrypted authentication code was computed using private key techniques then the user or other verifier may validate the encrypted authentication code by recomputing the encrypted authentication code with a supplemental device which also contains the secret key in an inaccessible form. This would, of course, be preferable to allowing the user to have direct access to the secret key, since this would enable him to falsify the signature. Many methods for generating and validating encrypted authentication codes using private keys may be found in the open cryptographic literature.

If the encrypted authentication code of the time and ID was computed using public key techniques then the verification of the encrypted authentication code may be performed using the public key without any form of access to the secret key.

In some applications the user may want to ensure that the time and encrypted authentication code received is not simply a copy of a previous message. This can be assured by the user generating and sending to the authentication device a random number which the device then appends to the time from the sealed clock before computing the digital encrypted authentication code. The encrypted authentication code then verifies that the time was not authenticated before the random number was generated.

The clock has a power supply designed to provide continuous power for the useful life of the system. The clock is also to be designed to be non-resettable, or to be non-resettable without execution of a carefully prescribed procedure, and the authentication device is to shut down itself should the power supply to the clock fail or should some other system diagnostics fail. In some realizations it might be useful to allow the clock to be resettable and for the authentication device to restart so long as a permanent, accessible record of the starting and stopping is kept in non-volatile memory within the sealed device. It would be useful if access to different functions of the authentication device were controlled by password or other similar means.

This source of authenticated time can be used to achieve the second object, that a computer system cannot be booted with the incorrect time. This is done by providing that a critical element, an element without which the computer cannot operate, of the computer is sealed together with the computer clock and with a circuit which can generate and output a large random number and which can verify the encrypted authentication code computed from the random number, the time, and the ID provided by the authenticated time device. This seal should have the same properties as that of the arbitrator itself. The source of authenticated time could, of course, be within the computer itself; and could even be the computer clock itself and be sealed together with the critical element of the computer. In this latter case, however, there would be no need for encryption; the computer would simply always get its time from the un-resettable sealed clock.

The computer clock is started and the computer booted up only if the time can be verified to have come from a source of authenticated time. If public key techniques are used then there is no need to make the public key within the computer inaccessible; with many private key techniques the key in the computer would have to be inaccessible to eliminate the possibility of falsifying the time. To ensure that a previously recorded time and signature was not being resubmitted to the computer, the system sealed within the computer could generate a random number and send it to the authentication device which would then append it to the time and authentication device ID before calculating the encrypted authentication code and returning it to the computer. The computer could then be sure that the time did not originate before the random number was generated.

It is another object of the present invention to provide a device which can authenticate the author, text, time, and authentication device ID of a digital document, and to ensure that one or more digital documents cannot be removed from a sequenced file of such documents without that fact being apparent.

This object may be achieved by adding to the capability of the authentication device discussed above the capability of observing data arriving from the user and of computing the encrypted authentication code from that incoming data (or in some embodiments a hash of that data) together with the authenticated time and the authentication device ID. In addition to the document data, the incoming data would include the user's digital signature, previously computed by the user from the document data, or hash of the document data, and the user's sequence number. Again, the user's signature in the authenticated document could be verified either by public or private key techniques. The authentication device then returns this encrypted authentication code to the outside where it can be verified using the public key and compared to the original.

If the full document data were presented to the authentication device, the encrypted authentication code could be computed either from the complete document, or the authentication device could first compute a hash of the document and compute the encrypted authentication code only from the hash plus the user's signature and sequence number, the time, and authentication device ID and sequence number. If the user had already performed a hash on the original document, an additional hash would be unneeded. Perhaps no hash would be computed for data below some fixed number of bits. The final digital encrypted authentication code is presented to the user at the output ports of the authentication device. The authentication device might also make available to the user at the output ports the original data so that the user could compare the data sent with the data returned in order to verify that the encrypted authentication code had been derived from the specified data.

Note that if a user should choose to append consecutive sequence numbers to the text of each document that he requests to be authenticated and which he then places in a particular file, then it will be possible for a verifier to check if documents have been removed from the file simply by looking for numbers missing in the sequence. Because of the authentication of the sequence number and date it would be impossible, even for the owner, to erase a document and then adjust the subsequent sequence numbers in the file without also changing all the dates. Similarly a document could not be changed without also changing the date to a later date, which may well have to be later than that on the following document in the file. Of course this last benefit is obtained whether or not there is a sequence number.

The authentication device might usefully have a mode of operation, if presented with ASCII text, in which the authentication is calculated only after the document text has been transformed to a standardized, but still readable, format, e.g. with one space between all words and symbols, no tabs or newlines, and with data in unusual formats, e.g. scientific formulas, omitted from consideration. Obviously, transformations which would reduce formulas, tables, special fonts, etc. to a standard form are also possible. Complex documents, e.g. digital pictures, if they are to be recognizable, would have to be archived in their original digital form in order to be verifiable. In this way a conventional ASCII document could be verified even if it had previously been copied in ways such as retyping or even cursive transcription, which altered the paragraph or word spacing format.

It could also be useful, for the authentication device itself to append and authenticate its own sequence number to each document. This could be useful in cases where a single user did not append his own sequence number. It could also be useful if there were only a few users of the notary so that a document could be found to be missing from one user's files by examination of the files of all of the other users.

DETAILED DESCRIPTION

Figure 1:
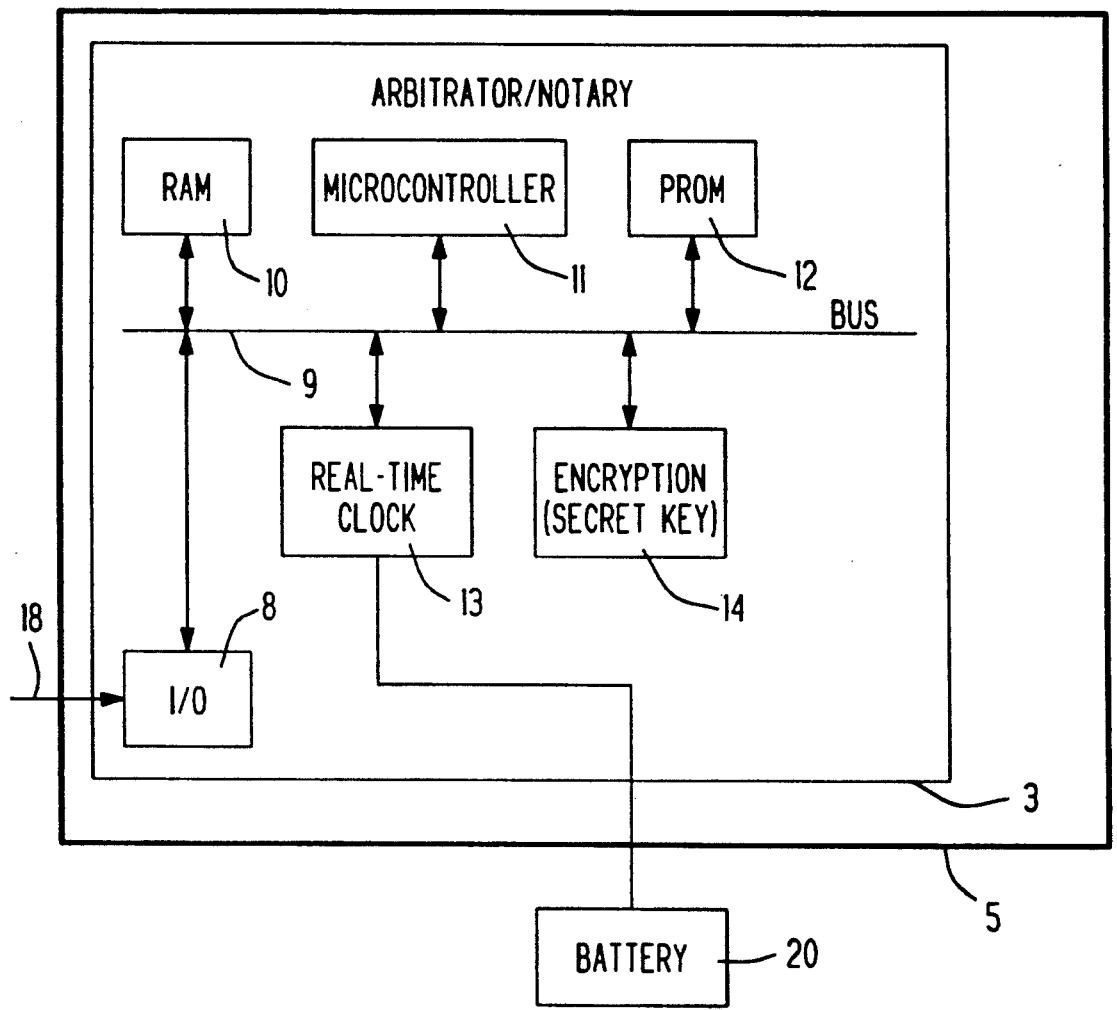
FIG. 1 is a block diagram of an authentication device in accordance with the invention.

One preferred embodiment of the present invention will now be described by reference to FIG. 1.

In FIG. 1, the time source or authentication device 3 is comprised of a random access memory (RAM) 10, some part of which is non-volatile e.g. EEPROM, a microcontroller 11, programmable read-only memory (PROM) 12, a realtime clock 13, and an encryption circuit 14. The authentication device also has an I/O circuit 8, by which the authentication device may, under control of the microcontroller 11, observe the state of the external communication lines or port 18 and by which data may be presented by the microcontroller 11 to the external communication lines. Communication between the microcontroller 11 and the other devices is carried out via a microprocessor bus 9.

All of the above components are packaged or sealed in a manner which makes them and their stored data physically inaccessible without making such an intrusion apparent upon inspection and causing the arbitrator itself to permanently cease operation. The authentication device could be assembled as a conventional chip set and encapsulated with a tamper protection system 5. Or, in the preferred embodiment, it could be manufactured as a single chip package built so that any attempt to probe the system, for example to determine the secret key, would in fact destroy the information. This could be accomplished with a combination of piezo-electric drives to destroy the MOS gates in the memory devices if the package were stressed sufficiently or if stress in the package were released, and conducting lines on the IC or package which would oxidize rapidly if the package were opened in the air. These latter protection means are also symbolized by 5 in FIG. 1.

The software for the authentication device is contained in the PROM 12. The other memory in the authentication device is the RAM 10. A principle use of this memory is to serve as temporary storage during calculation of the digital encrypted authentication code. The non-volatile part of RAM 10 maintains a record of any occasions when the clock was stopped and restarted.

The real-time clock 13 supplies the time which is appended to the authentication device ID. The power supply to the clock is a trickle-charged battery 20. The battery is to be accessible from outside the arbitrator 3 so that it can be replaced in the power-up state without affecting the clock 13. This results in the ability to maintain steady non-stop power to the clock for an indefinitely long time. The clock time is originally set at the factory.

The encryption device 14 is used to compute a digital encrypted authentication code from the time plus the authentication device ID ( encrypted authentication code data) using public key techniques.

During power-up the I/O circuit 8 comes up with its input ports disabled. This ensures that the authentication device 3 is isolated and that it is not possible to seize control of the authentication device 3 during power-up. After power up the microcontroller 11 is in control and effectively isolates the authentication device.

In the preferred mode of operation the microcontroller 11 monitors the I/O circuit 8. When a request for authenticated time is detected, the microcontroller 11 inputs a 64 bit random number supplied by the user, the correct time is retrieved from the real-time clock 13 and appended to the random number, the authentication device ID is appended, and the digital encrypted authentication code is computed on the combination. Then the random number, time, ID, and encrypted authentication code are presented for output to the I/O circuit 8 under control of the microcontroller 11.

Should the power, or system diagnostics, of the clock 13 or of other elements of the authentication device 3 fail in such a way as to cast doubt on the integrity of the clock or of other elements of the authentication device 3, the microcontroller 11 will store a permanent record of this fact in the non-volatile part of RAM 12, and respond to subsequent requests from the users with a default message indicating failure until the clock 13 has been reset, Which is possible in this embodiment. A simpler and more secure, but less flexible embodiment would not permit resetting. This could be ensured by setting a bit in the non-volatile part of RAM 12. If, as above, the clock or other element of the authentication device has failed, so long as power has been restored or is otherwise available to the clock 13, the microcontroller 11 will monitor the I/O circuit 8 for a command to reset the clock 13. Upon receiving such a command it will check that the clock has stopped, prompt for a password, required to provide flexible access control of all system operations, check that the new start time is later than the previous stop time, stored in the non-volatile part of the RAM 12, perform other system diagnostics, and restart normal operations of the arbitrator if all checks are positive. The stop and start times are to be permanent records and are to be accessible for reading out at any time, also under password access control. Should the non-volatile part of RAM 12 be filled by a series of stops and starts, the system could no longer be used.

To use this device to ensure that a computer could not be booted with incorrect time, a critical element of the computer, in this embodiment the CPU chip, would be sealed, using means such as discussed above, with the public key and a random number generator which generates a different 64-bit number as an authenticating signal each time it is called by using a secret key to encrypt a number which is incremented with each boot and which is stored in non-volatile RAM. Upon booting the chip would generate the 64-bit random number and send it to the authentication device. Only if a signature was returned verifying the random number which the authentication device added to its ID before the encrypted authentication code was computed, and the expected authentication device ID, would the returned time checked to be later than the previous stop time be used to set the computer system clock. Otherwise the CPU would refuse to boot.

No other signals presented to the I/O 8 constitute valid commands to the microcontroller 11, so that it is impossible for the user of the authentication device 3 to, e.g., reset the clock to an earlier time or to detect the value of the secret key.

It may not be necessary to add the authentication device ID to the time, since in many applications the secret key will be unique, and successful decryption of the encrypted authentication code will identify the notary. However, for those cases where the keys are not unique, or simply for reasons of convenience and simplicity, it will likely usually be useful to add the authentication device ID.

A few modifications of the system described above to supply authenticated time are needed to provide a system which will provide authentication for a digital document of the user ID, text (or other digital data), user sequence number, time, and notary ID and sequence number.

In this case, instead of simply presenting a request for authenticated time at the I/O circuit 8, the user presents a message comprising the user's public key digital signature, the user's document sequence number, and the text itself.

The microcontroller then uses the encryption circuit 14 to compute a hash from the input text and to append to the hash and the other data the internal time, the authentication device ID, and the authentication device sequence number, resulting in the encrypted authentication code data. Naturally the details of the hash computation must be known to any user or verifier. Next, a digital encrypted authentication code is computed from the encrypted authentication code data using a secret key and the encrypted authentication code is returned to the I/O 8.

In a second process, the microcontroller will also, before hashing is performed, parse the portions of the input text indicated by the user to be simple text and reduce it to a standard format, in this embodiment a format in which only ASCII characters on a standard keyboard are considered, tabs and newlines are ignored, and in which there is only a single space between each word. This format is more invariant under several forms of transcription and thus copies are more easily verified by recomputation of the digital encrypted authentication code as discussed above. An encrypted authentication code is then also computed and returned in which only the hash of this transformed version of the text is in the encrypted authentication code data, together with the user signature and sequence number, the time, authentication device ID, and authentication device sequence number.

The authentication device sequence number might also well be computed and appended to the time before the encrypted authentication code was computed in the first aspect of the invention where the only function of the authentication device is to supply authenticated time. If users of the authentication device could examine this sequence number they might detect if attempts were being made to deduce the secret key using plaintext attack using repeated requests for authenticated time.

Although these embodiments have been revealed in terms of the use of a public key encryption system with a single secret key, more complex systems could use multiple keys and other secret encryption data kept inaccessible within the authentication device to implement other authentication code encryption methods both public and private.

Two aspects of the invention have thus been revealed: (1) A device for providing authenticated time to users, and for using such device to ensure that computers cannot be booted up without setting their clocks to an authenticated time, and (2) A device for authenticating digital documents with respect to user, user sequence number, text, date, authentication device, and authentication device sequence number.

The foregoing description of the preferred embodiments lo of the two aspects of the invention have been presented for the purposes of illustration and description. They are not intended to be exhaustive or to limit the inventions to the precise forms disclosed. Many modifications and variations are possible in light of the above teaching. It is intended that the scope of the invention be limited not by this detailed description, but rather by the claims appended hereto.

What is claimed is:

1. A device for producing authenticated time for a user device, comprising:
    a clock;
    encryption means including a secret key;
    input/output means including a port for receiving and transmitting digital signals from and to the user device;
    a digital bus connected to the input/output means, the encryption means, and the clock;
    controller means connected to the bus for controlling operation of said input/output means, said clock and said encryption means to receive requests for authenticated time applied to the port of the input/output means, to read time data from the clock, to operate the encryption means to generate an encrypted authentication code from the time data, and to transmit from the port of said input/output means the time data and the encrypted authentication code;
    mean for preventing operation of the user device until the authentication code and the time data are transmitted from the port of the input/output means to the user device; and
    seal means enclosing said clock, said encryption means, said input/output means, said digital bus, and said controller means to prevent access to said clock, said encryption means, said digital bus, said controller means and said input/output means except via the port of said input/output means.

2. A device for producing authenticated time as claimed in claim 1 wherein said encryption means is adapted to encrypt data in accordance with a public key technique.

3. A device for producing authenticated time as claimed in claim 1 further comprising battery means for maintaining continuous operation of the clock.

4. A device for producing authenticated time as claimed in claim 3 wherein the battery means comprises a trickle charge battery.

5. A device for producing authenticated time as claimed in claim 3 wherein said battery means is replaceable when said authenticated time producing device is powered up.

6. A device for producing authenticated time as claimed in claim 1 wherein the port of the input/output means of the authenticated time producing device is disabled when the authenticated time producing device is not fully powered up.

7. A device for producing authenticated time as claimed in claim 1 wherein said controller means combines the time data with a device identification number, and the encryption means generates the encrypted authentication code from the combined time data and device identification number.

8. A device for producing authenticated time as claimed in claim 1 wherein said controller means detects errors in the time data from the clock and prevents operation upon discovery of an error in the time data.

9. A device for producing authenticated time as claimed in claim 1, 2, 3, 4, 5, 6, 7 or 8 wherein said controller means comprises a microcontroller, a PROM containing an operating program, and a RAM.

10. A device for producing authenticated time as claimed in claim 1 including means for generating a random number by the user device and applying the random number to the port of the input/output means along with a request for authenticated time, wherein said controller means combines the time data with the random number, and the encryption means generates the encrypted authentication code from the combined time data and random number.

11. A device for producing authenticated time as claimed in claim 1 wherein said user device is a computer which uses the time from the port of the input/output means to set a computer system clock.

12. A device for producing authenticated time as claimed in claim 1 wherein the clock is non-resettable.

13. A device for producing authenticated time as claimed in claim 1 wherein the clock is resettable upon failure of power to the clock and upon the reset time being later than a previously recorded time, and the authenticated time producing device includes a non-volatile memory for recording stop and start times of the clock.

14. A device for authenticating and time-stamping input data, comprising:
a clock;
encryption means including a secret key;
input/output means including port means for receiving and transmitting digital signals;
a digital bus connected to the input/output means, the encryption means, and the clock;
controller means connected to the bus for controlling operation of said input/output means, said clock and said encryption means to receive input data and requests for authenticating and time-stamping the input data applied to the port means of said input/output means, to read time data from the clock, to combine and input data with said time data, to operate the encryption means to generate an encrypted time stamp authentication code from the combined input data and time data, and to transmit from the port means of said input/output means the time data and the encrypted time stamp authentication code; and
seal means enclosing said clock, said encryption means, said input/output means, said digital bus, and said controller means to prevent access to said clock, said encryption means, said digital bus, said controller means and said input/output means except via the port means of said input/output means.

15. A device as claimed in claim 14 further comprising battery means for maintaining continuous operation of the clock.

16. A device as claimed in claim 15 wherein the battery means comprises a trickle charge battery.

17. A device as claimed in claim 15 wherein said battery means is replaceable when said device is powered up.

18. A device as claimed in claim 14 wherein the port means of the input/output means of the device is disabled when the device is not fully powered up.

19. A device as claimed in claim 14 wherein said controller means detects errors in the time data from the clock and prevents operation upon discovery of an error in the time data.

20. A device as claimed in claim 14 wherein said controller means comprises a microcontroller, a PROM containing an operating program, and a RAM.

* * * * *